United States Patent [19]

Fries

[11] Patent Number: 4,532,026
[45] Date of Patent: Jul. 30, 1985

[54] METHOD TO IMPROVE CIRCULATION CONTROL IN FLUIDIZED SYSTEMS

[75] Inventor: Bernard A. Fries, Orinda, Calif.

[73] Assignee: Chevron Research Company, San Francisco, Calif.

[21] Appl. No.: 395,865

[22] Filed: Jul. 6, 1982

[51] Int. Cl.³ .................. C01G 11/18; C01G 35/14
[52] U.S. Cl. ............................. 208/164; 208/153; 208/176; 208/DIG. 1
[58] Field of Search .............. 208/164, DIG. 1, 176, 208/106, 153; 137/5; 73/861.04; 34/25, 52

[56] References Cited

U.S. PATENT DOCUMENTS

| 2,945,127 | 7/1960 | Hanson | 208/DIG. 1 |
| 3,687,841 | 8/1972 | Saxton et al. | 208/153 |
| 4,062,761 | 12/1977 | Luckenbach | 208/164 |
| 4,228,353 | 10/1980 | Johnson | 73/861.04 |
| 4,272,982 | 6/1981 | Arnold et al. | 73/861.04 |
| 4,392,345 | 7/1983 | Geary, Jr. | 208/153 |

FOREIGN PATENT DOCUMENTS

| 0142606 | 7/1980 | Fed. Rep. of Germany | 73/861.04 |
| 0145874 | 1/1981 | Fed. Rep. of Germany | 73/861.04 |
| 0138216 | 10/1981 | Japan | 73/861.04 |

Primary Examiner—Gantz: Delbert E.
Assistant Examiner—Lance Johnson
Attorney, Agent, or Firm—Burns, Doane, Swecker & Mathis

[57] ABSTRACT

A method for improving fluidization of a particulate material flowing through a fluid conductor is provided by controlling the rate of addition of fluid, such as aerating gas or steam at a plurality of spaced apart locations along the conduit. The composition and rate of flow of the fluidized particles, is controlled by positioning a source of penetrative radiation such as neutrons, gamma rays, or X-rays at any location along the conduit so that the radiation traverses the fluidized particulate material flowing therein. A radiation detector is positioned opposite the source so that radiation absorbed in the conduit by the fluidized mixture may be measured as an electrical quantity. This electrical quantity may represent the total number of gamma rays of a preselected energy interacting with a detector in a given time interval or the average number of all gamma rays generating electrical pulses by interaction with the radiation detector. In accordance with such measured electrical quantity, the flow rate of aerating gas into the conduit is adjusted to maintain a stable composition and flow rate of the particulate material.

This method is applicable to a fluid catalytic cracking system to control continuously circulated catalyst in an aeration gas, such as steam. By proper control of steam at a plurality of positions along the conduits, a homogenous dispersion of gas bubbles and particulate material at a given mixture is obtained.

9 Claims, 19 Drawing Figures

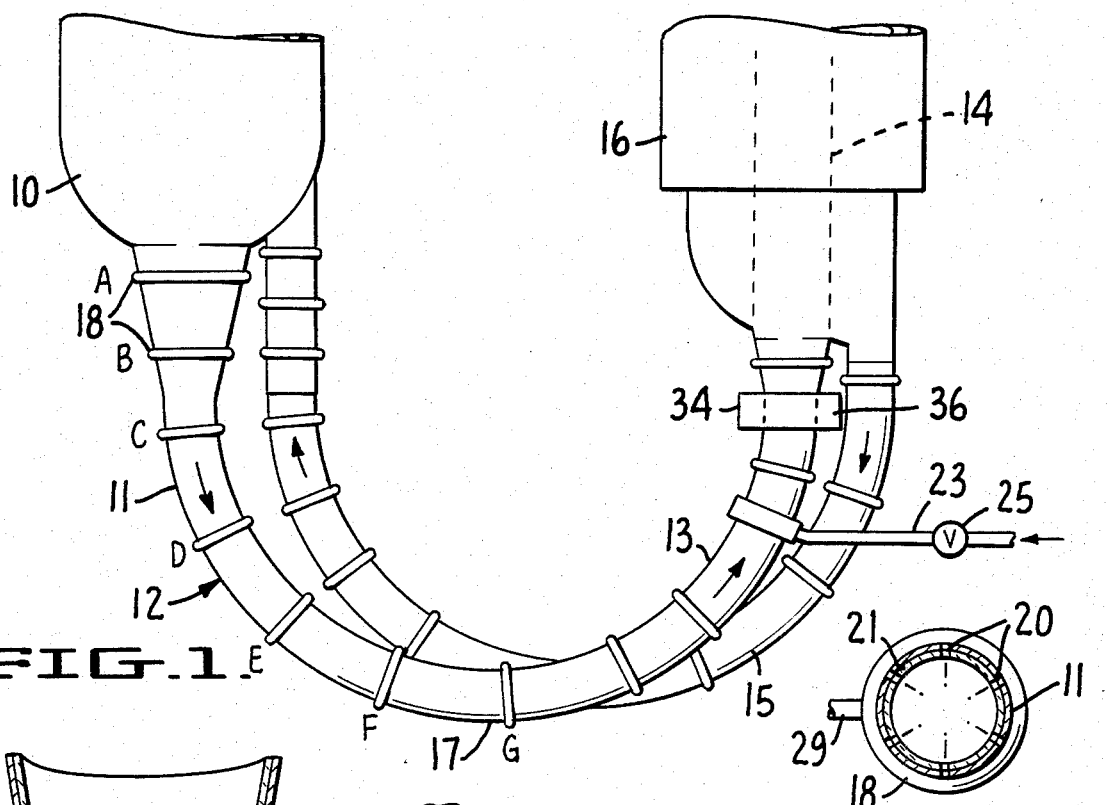
FIG. 1.
FIG. 3.
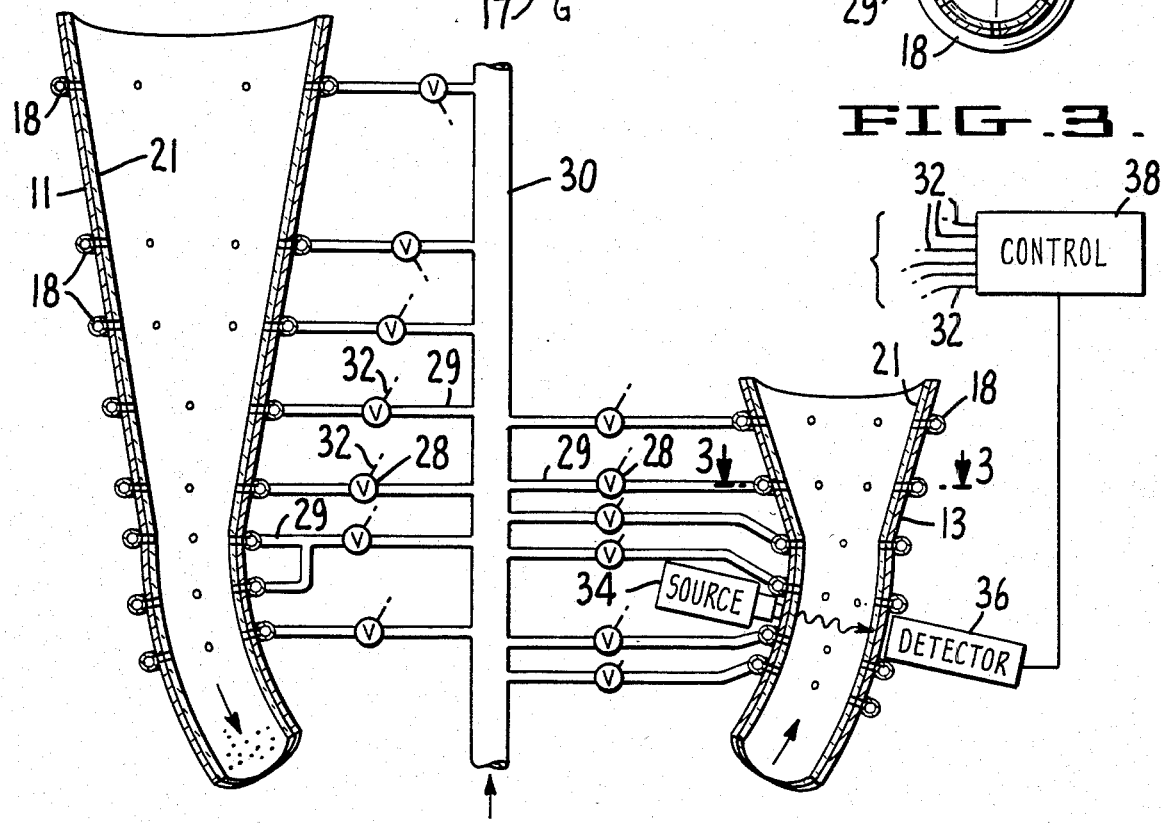
FIG. 2.

METHOD TO IMPROVE CIRCULATION CONTROL IN FLUIDIZED SYSTEMS

The present invention relates to fluidization of particulate materials for transport through conduits. More particularly, it relates to methods of and apparatus for controlling flow of particulate materials, such as coal, shale, catalyst or the like for transport as a low density fluidized mixture of particulate material and aerating gas.

It is a particular object of this invention to control both the composition and the rate of flow of a fluidized mixture of particulate material and gas through a conduit by positioning a penetrative source of electromagnetic radiation, such as a gamma ray emitting radioactive isotope, external to the conduit so that the instantaneous density, representative of the composition of the mixture may be measured by an electrical quantity indicative of gamma rays not absorbed by the mixture. The flow of aerating gas is then adjusted in an amount and to an extent required to maintain a minimum fluctuation in composition of said mixture at a desired flow rate, as measured by said electrical quantity, without "slumping" of the particulate material due to inadequate gas flow, or over-aeration of the mixture with accompanying instability of flow by generation of gas bubbles, interrupting constant volume flow, with or without accompanying mechanical vibration; additionally, such control of composition and flow rate improves overall flow characteristics of the particulate material with more economical use of aeration gas, such as air or steam, resulting in cost savings for operating compressors or steam generators, or both.

BACKGROUND OF THE INVENTION

Particulate materials such as finely ground, or comminuted, coal or shale, or catalyst particles are frequently fluidized for flow through conduits by introducing aerating gas, such as steam, air or the like, at locations spaced apart along the conduit. Generally, the flow of gas is at a pressure and in sufficient volume to achieve an average density of the mixture of particles and gas so that their flow is fluid-like. That is, the mixture is sufficiently homogeneous so that it acts as a fluid as it passes through the conduit.

In fluid catalytic cracking processes, finely divided catalyst particles are generally transported by a combination of gravity and steam flow. Steam flow both levitates and controls the direction of flow through a reactor riser wherein a hydrocarbon feed stream is added to the so fluidized catalyst particles after they have been heated. In a cyclic system, heat is usually added to the catalyst by burning "coke" from "spent" (already reacted) catalyst in a regenerator vessel. After reaction of the hydrocarbonaceous material with the hot fluidized catalyst in a reactor pipe, the mixture is separated into its gaseous and solid phases in a separator vessel. Hydrocarbon vapor is recovered overhead in the separator vessel and then distilled. Spent catalyst is returned from the separator vessel to the regenerator vessel through a stripping column in which an inert gas (steam usually) is flowing. Stripped catalyst flows through another conduit to the regenerator as a fluidized mixture produced by levitating steam. The pressure and volume of the aerating gas, control both the composition of the fluidized mixture and the circulation rate of catalyst particles returning to the regenerator for the next cycle.

Where a regenerator vessel and a separator vessel are arranged side-by-side, the two conduits are usually in the form of large U-tubes which have central sections that are substantially horizontal. The direction of flow changes in this central section from down to up in going from the regenerator into the riser-reactor. A similar change in direction is required in the other U-tube for spent catalyst to return for regeneration from the separator-stripper.

Generally aerating steam is admitted to the conduits, (formed by either the riser pipe or the spent catalyst return pipe), at a plurality of axially spaced apart locations. A plurality of nozzles enter the conduit radially to form an internal gas ring around the inner pipe wall. The nozzles are generally fed by a steam manifold encircling the pipe at each location. Sometimes the radial nozzles at more than one location are connected to a single common manifold.

In general, it is expected that gas from the nozzles at each axial position will uniformly mix with the particles, which typically have a diameter of 20 to 100 or more micrometers (microns) to form a homogeneous mixture of particles in a uniform dispersion of small gas bubbles. In practice it is customary to supply more steam than is required to achieve such homogeneity, because too little gas flow may result in no net movement of particles along the conduit. In the extreme, catalyst may "slump" to the low side of the conduit and result in two separate phases, solid and gas, with only the surface of slumped particles moving with the gas, a "sand dune" effect.

On the other hand, too much gas flow may produce unstable or inadequate catalyst flow with the gas with or without creation of bubbles which grow and collapse. This results in both reduced product yields from the system and higher operating costs because of uneconomical use of compressors or steam generators to provide aeration gas.

In severe cases, bubble growth and collapse may also be rapid and result in extreme vibration of the U-tube conduits and the interconnected regenerator, reactor and stripper vessels. Since in commercial refineries these vessels are generally supported at levels of 60 to 100 feet above ground, undue mechanical vibration may pose a serious hazard to the entire system.

Accordingly, in all but the uniformly dispersed, small bubble case, inadequate and uneconomic catalyst flow results and serious mechanical problems can result. For these reasons, there has long been a need for accurate control of the aeration gas for more efficient use of the gas and to optimize both the composition of the fluidized mixture and the rate of flow of a uniform dispersion of catalyst particles in the fluid stream.

In general, fluid catalytic cracking units operate at temperatures of about 950° F. to 1000° F. for the reactor riser and up to about 1250° F. in the regenerator. Accordingly, the catalyst temperatures in both of the U-tubes supplying fresh catalyst and returning spent catalyst are usefully kept well above about 900° F. during continuous recirculation. For this service, the steel conduits forming the U-tubes have walls that are on the order of an inch thick. Typically, they are several feet in diameter. The interior surface of the conduits is coated with a ceramic material both to insulate the steel and to prevent abrasion by the fine catalyst. The normal rate of flow of such catalyst is in the range of 30 to 60 tons per minute and the resulting average velocity of the catalyst particles is on the order of 10 to 30 feet per second and gas velocity is on the order of 30 to 60 feet per second through the conduits.

While it has been known heretofore to measure bulk density of materials with electromagnetic radiation, for example X-rays, gamma-rays and neutrons, measurement of, and use of such measurement to control both composition and rate of flow of comminuted particles in an aerated stream has not been known or used. Specifically, it has not been known or suggested heretofore to control a fluid catalytic cracking system, by irradiating a flowing stream of a mixture of particles, such as catalyst, and aerating steam with penetrative radiation, such as gamma rays, detection of the absorption of such gamma rays by the flowing stream of a mixture of such catalyst particles and steam, and then regulating steam supplied to the conduit in an amount and to an extent required to control fluctuations in the composition and rate of flow of the mixture in response to said gamma ray absorption.

SUMMARY OF THE INVENTION

In accordance with the present invention, a method for improving fluidization of a particulate material flowing through a fluid conductor is provided by controlling the addition of aerating gas such as steam into the conduit at a plurality of spaced apart locations along the conduit. The method of control involves positioning a source of penetrative radiation such as neutrons, gamma rays, or X-rays at a location anywhere along the conduit in which the fluidized material is flowing. A radiation detector is positioned on the opposite side of the conduit so that radiation absorbed in the conduit by the fluidized mixture may be measured as an electrical quantity. This electrical quantity may represent the total numbers of gamma rays of a preselected energy interacting with a detector in a given time interval or the average number of all gamma rays generating electrical pulses by interaction with the radiation detector. In accordance with such measured electrical quantity, the rate of flow of aeration gas into the conduit is adjusted in an amount and to an extent necessary to maintain the measured electrical quantity within a preselectable range of values representative of stable composition and desired flow rate of the particulate material. By this arrangement, controlled flow of gas into the particulate material results in a mixture having a homogeneous dispersion of gas bubbles and particulate material at a given mixture density which prevents slumping or bridging of particulate material in the conduit, or over-aeration of the mixture with waste of aeration gas, low flow of the mixture or generation of unstable bubbles which rapidly expand and collapse and which may result in either decreased catalyst flow or unstable flow that may in turn set up mechanical vibrations in the conduit.

In a preferred form of apparatus, the method of the present invention is particularly applicable to a fluid catalytic cracking system. In such a system, one of the conduits is a large U-tube interconnecting a regenerator to a reactor pipe and a catalyst hydrocarbon vapor separator. Another large U-tube interconnects a stripper column from the separator for return of spent catalyst back to the regenerator. In such an arrangement, the U-tubes are generally of changing diameter and a central portion of each U-tube is generally horizontal, if the separator vessel and the regenerator are in substantially side-by-side positions. Aeration gas is supplied under pressure at a plurality of locations along the conduits by radial flow inwardly from the wall of the conduit and the air or steam supplied to the conduit is through nozzles which are connected to a ring manifold surrounding the conduit. One or more manifolds may be interconnected and flow of aeration gas may be controlled to either one or a plurality of the manifolds.

In a U-tube arrangement the direction of flow is reversed between the downflowing and upflowing legs. Because of this reversal, the rate at which the aeration gas is added to the mixture may be particularly critical near the substantially horizontal section forming the bottom of the U-tube. Downflow of particles in that area is assisted by gravity and the normal upflow of gas may be reversed by such particle downflow. Accordingly, in a preferred embodiment the control of such aeration fluid, if not extended over the entire U-tube, is preferably in or adjacent to the horizontal U-tube section.

Further objects and advantages of the present invention will become apparent from the following detailed description taken in conjunction with the accompanying drawings which form an integral part of the present application.

IN THE DRAWINGS

FIG. 1 is a perspective side elevation view of the lower portion of a fluid catalytic cracking (FCC) system having a pair of U-tube conduits to which the present invention has been applied for control of aeration gas being added to fluidize the system.

FIG. 2 is a side elevation cross-sectional view through a portion of both the down leg and the up leg of one of the U-tubes shown in FIG. 1 interconnecting the regenerator and the riser-reactor or stripper separator, and particularly illustrates nozzle arrangement for fluidization of particulate material in the tubes under the control of a radiation source and measuring system.

FIG. 3 is a cross-sectional view taken in the direction of arrows 3—3 in FIG. 2 through one of the ring manifolds and illustrates a preferred arrangement of radial nozzles used to aerate the solid particulate material flowing into a riser tube or out of a stripper column.

DESCRIPTION OF THE PREFERRED EMBODIMENTS

Figure 4A:
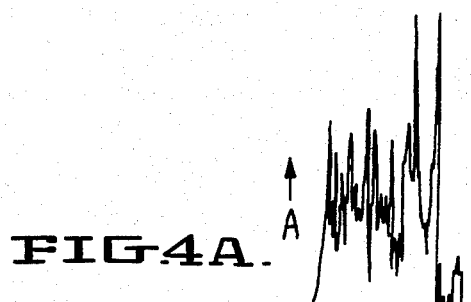
FIGS. 4 through FIG. 10 are time-amplitude plots of actual measurements of electrical quantities representing the instantaneous density of fluidized catalytic material flowing in an FCC system such as that shown in FIGS. 1 to 3.

Referring now to the drawings and in particular to FIG. 1, there is illustrated application of the method of the present invention to a fluid catalytic cracking (FCC) system in which a regenerator unit 10 continuously supplies fresh or regenerated catalyst to a down-leg 11 of U-tube 12. U-tube 12 supplies catalyst to a reactor pipe 14, generally indicated as being connected to the upper end of the up-leg 13 of U-tube 12. The riser reactor pipe 14 is indicated generally as entering a separator vessel 16, wherein hydrocarbon vapor and catalyst are disengaged.

In such a system, hot catalyst particles are transported from regenerator 10 through down-leg 11 of U-tube 12 and then upwardly into up-leg 13 by a combination of gravity and steam used as the aerating, or levitating, gas.

To supply aerating steam, a plurality of manifolds 18 are axially spaced along the conduit. As indicated, the spacing between manifolds 18 may increase as the diameter of U-tube 12 decreases through down-leg 11. This permits maintenance of similar flows of aerating gas as the diameter of conductor 11 decreases and also assures adequate gas as the U-tube turns into the substantially horizontal section 17 at the bottom of U-tube 12. As shown, ring manifolds 18 are axially spaced along the full length of U-tube 17. Similarly, return U-tube 15 includes a like arrangement of steam manifolds 18.

As indicated in FIG. 3, each ring manifold 18 feeds steam into a plurality of radial nozzles 20 which are flush with the surface of internal ceramic lining 21 of pipe or conduit 11.

A wide variety of hydrocarbon feedstocks may be used such as virgin petroleum distillates, residual petroleum fraction, deasphalted oil, hydrofined hydrocarbon oils or mixture thereof. Such feedstock may be added to the heated and fluidized catalyst particles as schematically indicated by line 23, controlled by valve 25.

In accordance with the present invention the flow of steam to each of manifolds 18 is under control of a valve 28, through lines 29 connected to a common steam source, steam header 30. Control of valves 28 may be manual or as indicated by dashed lines 32 connected to control means 38 for automatic adjustment of supply steam in an amount and to an extent necessary to maintain the desired homogeneity of the vapor and particle mixture.

The basic information for controlling such vapor flow in accordance with this invention is generated by a source of electromagnetic radiation 34. In a preferred embodiment, source 34 is a gamma ray emitting radioactive isotope having sufficient energy to penetrate the steel walls of leg 13, its insulation coating 21 and the mixture flowing through it. In one embodiment, a cobalt-60 source has been found to be quite satisfactory to penetrate both thicknesses of wall 13, coating 21 and the mixture to reach diametrically opposed detector 36. Detector 36 may be a Geiger-Mueller tube, a proportional counter or an ionization chamber. However, preferably, detector 36 is a scintillation counter, such as one using a thallium-activated, sodium iodide crystal, with a coupled photomultiplier tube to detect gamma rays absorbed in the crystal.

The number of gamma rays interacting with detector 36 from source 34 is directly related to the composition of the flowing material since absorption of such gamma rays in the steel and coating are substantially constant, where source 34 and detector 36 are not moved during the detection period. The total number of gamma rays detected in a given time period, or the time required to detect a given number of gamma rays, may be measured. The average rate of detection of gamma rays may also be measured as an electrical current (I), or voltage (E). The measured electrical quantity may then be displayed as by a time versus amplitude plot and the openings of valve 28 regulated to maintain the composition and flow rate within a substantially constant range of values representative of homogeneous flow of fluidized particle in conduit 12.

Other sources of electromagnetic radiation may also be used. For example, an X-ray tube with sufficient energy and flux density may be used as a source. A neutron generator, or a radioactive isotope activated neutron emitter, may be used as a source of fast, epithermal or thermal neutrons. With thermal neutrons as such a radiation source, either a slow neutron detector for transmitted neutrons or a gamma ray detector for promptly-emitted gamma rays generated by thermal neutrons absorbed in the mixture, may be used.

As discussed above, a particular object of this invention is to produce homogeneous flow of particulate material in a fluidizing gas by control of the rate of delivery of gas to maintain a given substantially uniform density in the conduit. While a single source and detector combination, such as 34 and 36 in FIGS. 1 and 2, may be used to perform the method of the present invention, a plurality of such source-detector pairs may be advantageously positioned at spaced apart locations along U-tube 12. In any event, the primary control of such flow is preferably through measurement of mixture density at at least one position along the conduits and adjustment in accordance therewith of steam supplied to at least one ring of nozzles 20 through its corresponding manifold 18.

FIGS. 4 through 10 show measurements of fluid catalyst flow through a U-tube, such as 12, in a commercial FCC system. Each of FIGS. 4 to 10 represent instantaneous density, measured as voltage amplitudes (arbitrary), plotted against time, as indicated, with source 34 and detector 36 positioned as noted below, and with steam flow varied at one of the manifolds 18 by regulation of its supply valve 28. The manifold rings are identified sequentially, A through G, beginning with A at the first ring in down-leg 11 from regenerator 10.

Figure 4B:
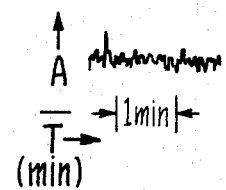

FIG. 4A is a plot of density fluctuations downstream from the C-ring. As indicated, large arhythmic fluctuations indicate severe over-aeration of the mixture. FIG. 4B represents a similar record, at the same location after aeration was adjusted in accordance with the invention. As shown, the result was small density fluctuations, each of approximately the same size and with rhythmic amplitude variations.

Figure 5A:
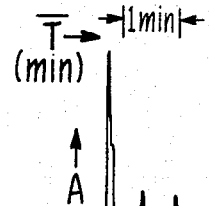
Figure 5B:
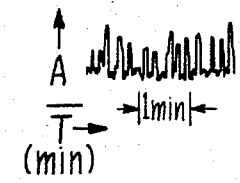

FIGS. 5A and 5B represent similar plots in which aeration steam pressure was varied at the same location along down-leg 11. In FIG. 5A, the single large excursion of the curve is believed to have been due to creation of a large bubble that expanded and suddenly collapsed. Otherwise the flow is seen to be quite stable. FIG. 5B is a plot after steam pressure was increased from 85 to 95 psi with substantial decrease in stability of the composition, as indicated by significant increase in the number of amplitude excursions.

Figure 6A:
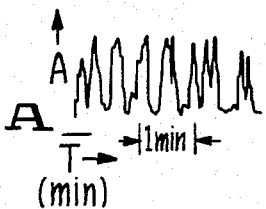
Figure 6B:
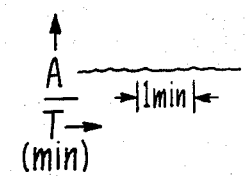

FIGS. 6A and 6B are plots of gamma ray density measurement at level G, near the bottom of horizontal section 17 of the U-tube. In FIG. 6A the periodic large departures of the plot from the base line is believed to have been due to creation of numerous large bubbles which slowly moved along the U-tube and interfered with overall flow volume of catalyst.

FIG. 6B indicates a substantial decrease in the density fluctuations, with small rhythmic variations after steam was adequately controlled in accordance with this invention.

Figure 7A:
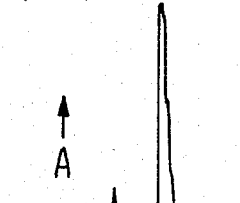
Figure 7B:
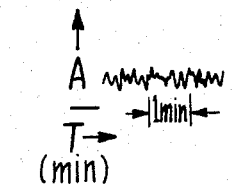

FIGS. 7A and 7B represent plots of catalyst-steam mixture flow near the F-ring. FIG. 7A indicates creation of one large bubble which effectively blocked flow of catalyst through the U-tube for a prolonged period, and then passed through the system. FIG. 7B shows improved overall flow at an average density which assured high flow of a homogeneous mixture of vapor and particles.

Figure 8A:
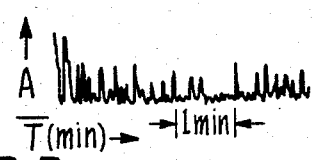
Figure 8B:
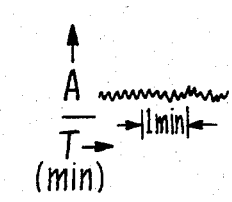

FIGS. 8A and 8B illustrate the effect of an aeration change made downstream from a ring manifold, such as at the D-ring, on measurements made upstream. The left-hand portion of the FIG. 8A plot indicates such measurement above the D ring with all nozzles open. The right hand portion was made after a single nozzle was closed. FIG. 8B is a similar plot after a second nozzle, or tap, was closed showing improved control of the aeration rate.

Figure 9A:
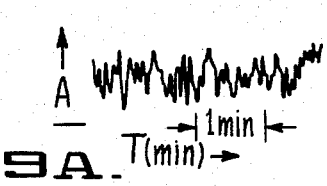
Figure 9B:
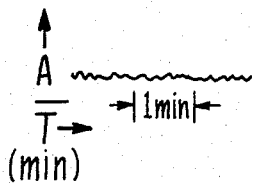

FIGS. 9A and 9B are plots of flow in the return U-tube, such as 15, respectively before and after, aeration flow in riser pipe U-tube 17 was adjusted. This plot clearly represents that proper control of aeration in one U-tube will "smooth" flow throughout the entire FCC system.

Figure 10A:
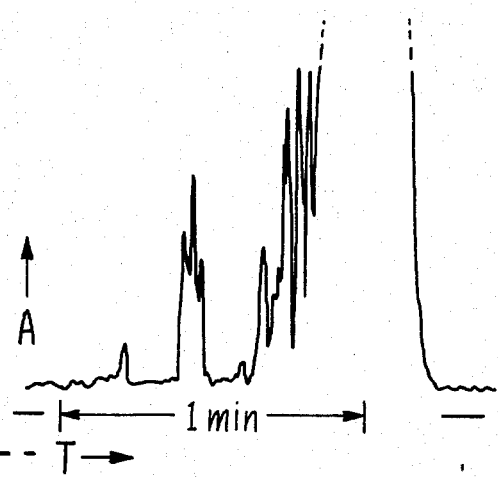
Figure 10B:
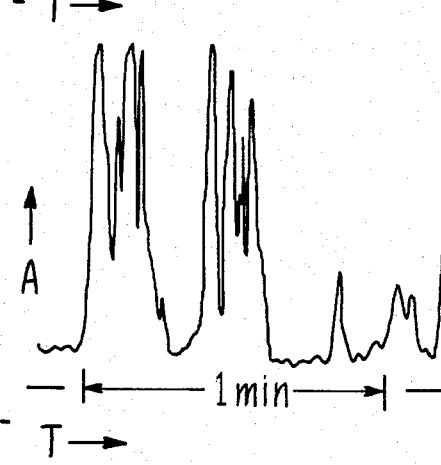
Figure 10C:
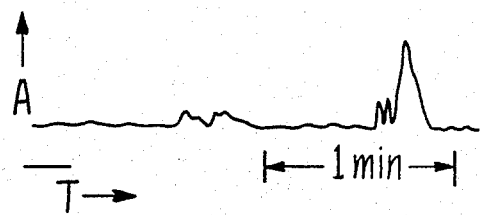
Figure 10D:
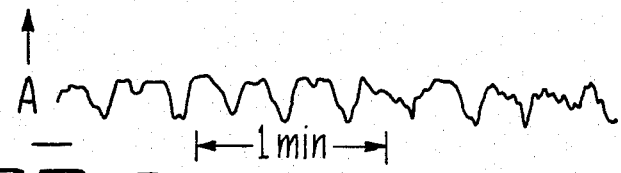

FIGS. 10A, 10B, 10C, 10D are plots of catalyst-steam flow in a commercial FCC system indicating adequate and inadequate control of mixture composition and flow rates. FIGS. 10A and 10B are examples of poor control of composition and flow through over-aeration of the mixture. These measurements of density were made near the C-ring. FIG. 10C indicates an acceptably slow variation in density from the base line for flow. FIG. 10D illustrates another slow, rhythmic pattern of changes in density near the E-ring. Such amplitude and slow oscillations are within the preselectable range of values representing adequate control of composition and flow rates in accordance with the present invention.

While the present invention has been illustrated and described in connection with a particular type of FCC unit, it is to be understood that the method and apparatus of the invention may be used to control the composition and rate of flow of any mixture of particulate materials in a flowing fluid. The method is also applicable to other fluid catalytic cracking systems such as those using an external riser pipe as the reactor, or a unitary regenerator and separator vessel. In general, such systems do not use large U-tubes, but rather vertical pipes with angled transition sections for reversal of flow direction of the fresh or spent catalyst. In such systems, the composition of the catalyst-gas stream is critical in the transition zones and the present invention is particularly applicable to control such flow.

While only a few embodiments of the present invention have been illustrated and described, various modifications or changes in both the method and apparatus will become apparent to those skilled in the art without departure from the inventive concepts hereof. Accordingly, all such modifications of changes coming within the scope of the appended claims are intended to be included.

I claim:

1. A method of controlling fluidization of a particulate material flowing through a fluid conduit, wherein the composition and flow rate of the fluidized mixture of said particulate material in an aerating gas is maintained by introducing aerating gas into said conduit at a plurality of spaced apart locations long said conduit, which comprises
   positioning a penetrating source of electromagnetic radiation adjacent to said conduit wall to irradiate said fluidized mixture of said particulate material and said gas in said conduit,
   positioning a radiation detector to intercept radiation from said source after partial absorption of said radiation by said fluidized mixture in said conduit,
   monitoring the amount of radiation intercepted by said detector to thereby detect localized regions of inhomogeneity in the density of said mixture, and
   controlling the flow of said aeration gas into said conduit at at least one of said spaced apart locations in an amount and to an extent necessary to maintain substantially uniform density of said mixture in the region of said detector, whereby
   the composition of said mixture of particulate material and gas and the flow characteristic of said flowing mixture in said conduit may be controlled, including maximum volume of said particulate material at a given density without slumping of said particulate material or without instability of flow and accompanying increased mechanical vibration of said conduit induced by formation and collapse of bubbles of gas in said mixture within said conduit.

2. The method in accordance with claim 1 wherein at least a portion of said conduit varies in volume along the length thereof.

3. The method in accordance with claim 2 in which said conduit is a U-tube.

4. The method of claim 1 in which said gas is introduced radially into said conduit at each of said plurality of spaced apart locations.

5. The method of claim 1 in which said penetrative electromagnetic radiation source is selected from the group consisting of fast neutrons, epithermal neutrons, thermal neutrons, gamma rays and X-rays.

6. The method in accordance with claim 5 in which said source is a gamma ray emitting radioactive isotope and said radiation detector is a gamma ray detector.

7. The method in accordance with claim 1 wherein said aeration gas is steam and said steam is supplied from a common source to at least two of said axially spaced apart locations, and flow of said steam from said common source is controllable at least at one of two said locations.

8. The method of claim 1 wherein upon detection of a sudden increase or sudden decrease in detected radiation through said mixture in said conduit due to formation and collapse of gas bubbles therein, said aeration gas flow is controlled to suppress growth of said bubbles as indicated by a substantial decrease in rapid variations in said monitored radiation.

9. In a fluid catalytic cracking system wherein heated fresh or regenerated catalyst is supplied to a reactor pipe from a regenerator vessel with a hydrocarbonaceous feed stream and spect catalyst from a separator-stripper is returned from said reactor to said regenerator by the introduction of aeration fluid into the conduits for circulation of said catalyst, the improvement for controlling the composition of the mixture of said catalyst and fluid, at a desired flow rate of said catalyst which comprises;
   positioning a source of penetrating electromagnetic energy to traverse at least one of said conduits to irradiate said fluidized mixture of catalyst particles and said fluid flowing therein,
   positioning a radiation detector to intercept radiation traversing said mixture flowing in said at least one conduit,
   monitoring the amount of said penetrating energy not absorbed in said mixture and detected by said radiation detector, to thereby detect pockets of inhomogeneity in the density of said mixture, and
   controlling the flow of said fluid into said at least one conduit at a localized region along the length thereof in an amount and to an extent necessary to reduce irregularities in the density of said mixture.

* * * * *